United States Patent [19]

Marlowe

[11] 4,126,814

[45] Nov. 21, 1978

[54] ELECTRON GUN CONTROL SYSTEM

[75] Inventor: Frank J. Marlowe, Kingston, N.J.

[73] Assignee: RCA Corporation, New York, N.Y.

[21] Appl. No.: 749,178

[22] Filed: Dec. 9, 1976

[51] Int. Cl.² ............................................. H01J 29/52
[52] U.S. Cl. .............................. 315/307; 340/324 A
[58] Field of Search ............ 315/107, 169 R, 169 TV, 315/291, 307, 324, 30; 328/270; 340/324 A

[56] References Cited

U.S. PATENT DOCUMENTS

| 3,760,279 | 9/1973 | Rudolph | 315/107 X |
| 3,838,313 | 9/1974 | Anderson | 315/291 |
| 3,976,991 | 8/1976 | Hickin et al. | 340/324 A |
| 4,000,440 | 12/1976 | Hall et al. | 315/307 X |

Primary Examiner—Eugene La Roche
Attorney, Agent, or Firm—E. M. Whitacre; G. H. Bruestle; G. E. Haas

[57] ABSTRACT

An electron gun is controlled by a system which stores the characteristics of the gun in a random access memory. The contents of the memory feed an electron gun driver which properly biases the gun. The characteristics of the gun are stored in the memory by using a collector to sense the electron beam. A comparator is connected to the collector and a reference brightness signal generator. The output of the comparator controls the storage of the characteristics in the memory.

9 Claims, 2 Drawing Figures

ELECTRON GUN CONTROL SYSTEM

BACKGROUND OF THE INVENTION

The present invention relates to image display devices having a plurality of electron beams each of which scans a different portion of the display and more particularly to systems for controlling each of the electron beams to obtain uniform brightness across the entire screen of the display.

Recently image display devices have been proposed having a plurality of modules each having its own electron beam for scanning a portion of the device screen. A device of this type is described in U.S. Patent Application Ser. No. 615,353 entitled "Guided Beam Flat Display Device" filed Sept. 22, 1975 by C. H. Anderson now U.S. Pat. No. 4,028,582. One of the problems encountered with such displays is that the brightness may vary from one portion of the screen to the next due to variations in the electron beam for that particular portion. For such devices to have practical use, the brightness of the display and hence the various electron beams must be relatively uniform.

SUMMARY OF THE INVENTION

An electron gun control system for a multielectron beam display device has a means for sensing the electron current from the gun. A comparator compares the sensed beam current signal with a generated reference signal. The output of the comparator controls the writing of generating digital words in a random access memory. The digitized image brightness signal addresses the memory. The output of the random access memory controls an electron gun driver which biases a grid of the electron gun.

DETAILED DESCRIPTION OF THE PREFERRED EMBODIMENT

Figure 1:
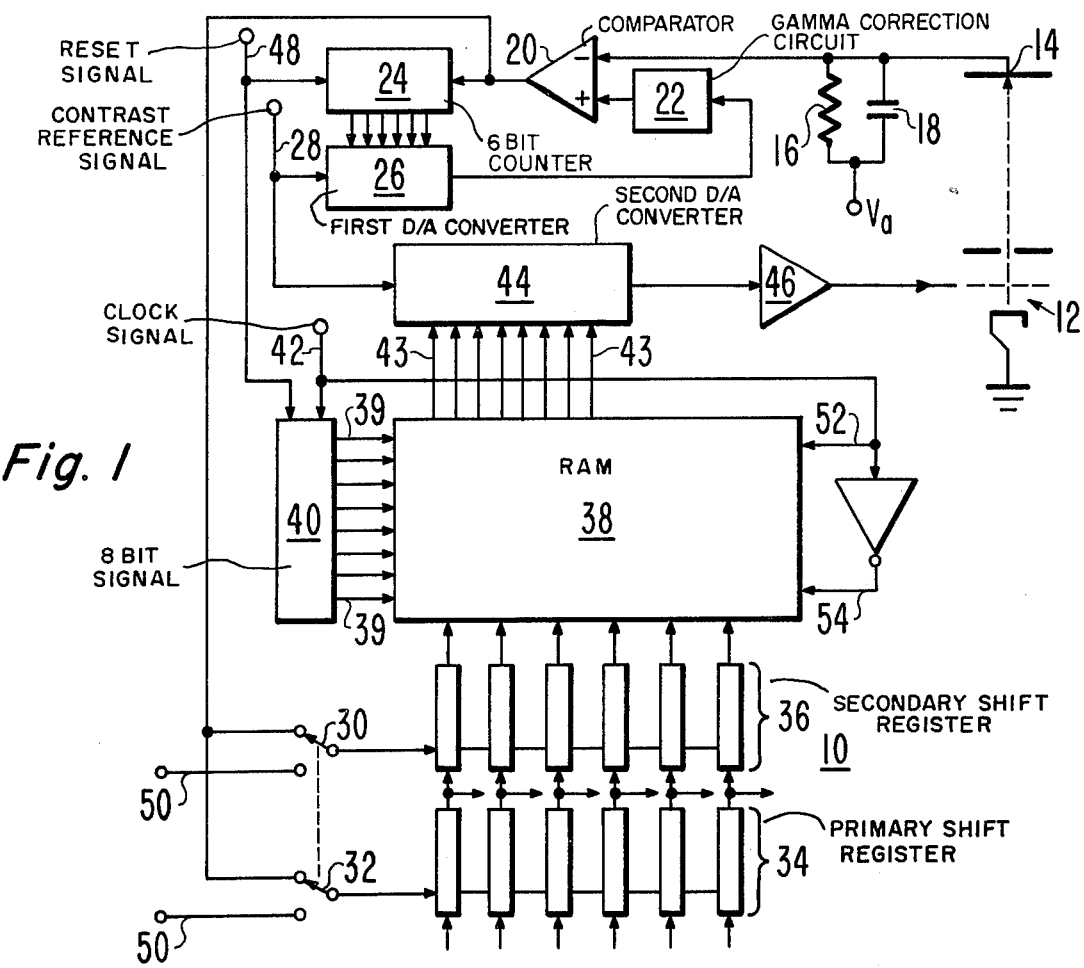
FIG. 1 is a circuit diagram of the electron gun control system.

With initial reference to FIG. 1, an electron gun control system, generally designated as 10, controls an electron gun 12 of a cathodoluminescent display. The output of the gun 12 may be directed toward the screen of the display, not shown, or toward a collector 14. Connected between the collector 14 and anode potential $V_a$, is a collector current sensor resistor 16. The capacitor 18 represents the collector capacitance. Typically, the collector sensor resistor 16 may be 200 ohms and the collector capacitance 18 may be 200 picofarads. The collector 14 is also connected to the inverting input of a comparator 20. The non-inverting input of the comparator 20 is connected to a gamma correction circuit 22 similar to the circuits used in conventional television receivers for compensating for the non-linearity of the display brightness with respect to the grid voltage of the electron gun. The output of the comparator controls a six bit counter 24 whose output is connected to the input of a six bit first multiplying digital-to-analog (D/A) converter 26. The other multiplying input of the first D/A converter 26 is connected to the contrast reference signal for the display which is on line 28. The output of the first multiplying D/A converter 26 is connected to the input of the gamma correction circuit 22. The output of the comparator 20 is also connected by means of switches 30 and 32 to the control inputs of a primary and a secondary shift register 34 and 36, respectively, which are described in detail in Patent Application Ser. No 740,770 entitled "Line Scan Converter for An Image Display Device" filed Nov. 10, 1976 by F. J. Marlowe. Both the primary and secondary shift registers 34 and 36 have one stage for each of the picture elements in the display line to be scanned by the gun 12. The primary shift register input is connected to a digitized video brightness signal. The output of the primary shift register 34 is connected to the secondary shift register 36 whose output is connected to the addressing input of a 512 bit random access memory 38 which is capable of storing 64 words each having 8 bits. The storage input 39 of the random access memory 38 is connected to the output of an 8 bit counter 40. A clock (not shown) is connected on line 42 to the 8 bit counter 40 and the read-write control inputs 52 and 54 for the memory 38. The output 43 of the memory 38 is connected to a second multiplying D/A converter 44 which multiplies the 8 bit output of the memory 38 by the contrast reference signal on line 28. The output of the second multiplying D/A converter 44 is fed into a grid amplifier 46 whose output biases a grid of the electron gun 12. A clocked control reset signal on line 48 is connected to both the 6 bit counter 24 and 8 bit counter 40.

The present system uniformly controls the electron beam currents throughout the display, utilizing a random access memory to equalize each gun output. A separate system is used to control each beam in the display. The memory stores mapping information to convert various brightness levels to the necessary grid voltage to generate the electron beam which will illuminate the screen to the desired brightness level. During the display of an image, the video signal containing the brightness information for the display is digitized into a 6 bit word for each element of the display which addresses the random access memory 38. The mapping information is read out of the memory 38 and combined with a reference contrast signal which then is amplified to bias the electron gun grid. The proper mapping information is stored in the memory 38 by sensing the electron beam current levels for various grid voltages and storing the grid voltages which produce various fixed and predetermined levels of electron beam current.

The six bit counter 24 and the six bit first multiplying D/A converter 26 form a reference brightness signal generator capable of generating 64 different brightness signal levels. When a given grid voltage produces an electron beam which exceeds the reference brightness signal from the generator, the eight bit word from the counter 40 which generated the grid voltage is stored in the memory. Although the electron gun characteristics may vary from module to module of the display, the use of the reference brightness signal generators and the memory ensure that equalized electron beam currents will be generated for the various brightness levels.

When the display is turned on but before the image is to be displayed, the mapping from the desired brightness to the required grid current must be stored in the memory 38. Initially, the six and eight bit counters 24 and 40 respectively are set to zero The primary and secondary shift registers 34 and 36 are also preloaded so that the first digital word fed to the memory will be zero and that the next sixty-three clock pulses to the shift registers 34 and 36 will step the address one number at a time from one to sixty-three. Switches 30 and 32 switch the clocking input of the shift registers from a display clock output on lines 50 to the output from the comparator 20 so that the comparator output clocks the information.

During this initial storage period, the memory 38 is cycled between read and write. During the first cycle, the zero contained in the eight bit counter 40 is written into the memory 38 and stored at address zero. The memory is then cycled to read by a clock pulse on line 42 fed to the read/write inputs of the memory 52 and 54, respectively. The zero stored at address zero is read out of the memory and fed into the 8 bit multiplying digital to analog converter 44 where it is converted to an analog signal and multiplied by the contrast reference signal on line 28. The product is fed into the grid amplifier 46 and used to bias the grid of the electron gun 12. At the same time, the zero contained in the six bit counter 24 is fed into the first multiplying D/A converter 26 where it is converted to analog and multiplied by the contrast signal on line 28. The product is fed to the gamma correction circuit 22 and then into the non-inverting input of the comparator 20. The electron beam generated by gun 12 impinges the collector 14 which senses the resulting electron current by means of the current sensing resistor 16 and feeds it to the inverting input of the comparator 20. The comparator 20 will not have an output until the collector current makes a step above the output of the gamma correction circuit 22, which is now zero.

Assuming no comparator output, a 500 kHz clock signal on line 42 increases the eight bit counter 40 by one and shifts the memory 38 to the write mode. A one is stored in location zero of the memory and then the memory is cycled to read. This number is read out of the memory and multiplied by the second multiplying digital to analog converter and fed through grid amplifier 46 to the electron gun 12. The generated beam is then sensed by the collector 14 and fed to comparator 20. This process is repeated until the electron beam current makes a step above zero. When this occurs, the output of the comparator increases the count of the six bit counter 24 and shifts the primary and secondary shift registers 34 and 36 causing the next higher address to be selected in the memory 38. The last number read by the memory 38 remains stored in location zero. The cycle is repeated for the next memory address. The next higher number from the eight bit counter 40 is fed into the memory 38 and stored at the new address. The memory is then cycled to read and this newly stored number drives the electron gun 12. The electron beam output is compared in comparator 20 with the new contents of the six bit counter 24, three for example. The cycling of the counter 40 in the memory continues until the electron beam current exceeds three at which point the comparator switches states increasing the six bit counter and shifting the contents of the primary and secondary shift registers 34 and 36. This read-write cycle of the memory 38 is continued until the storage at address sixty-three is complete. At this point, the memory has been filled with the electron current information needed for the display.

Figure 2:
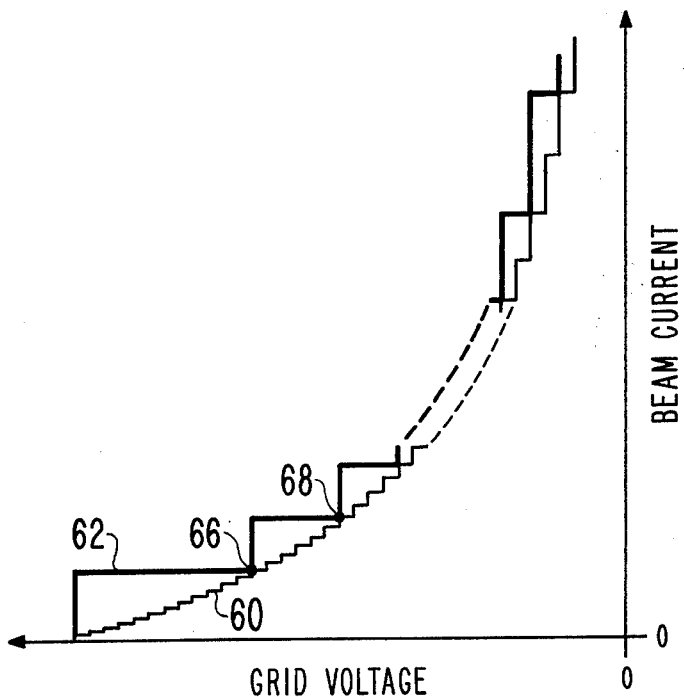
FIG. 2 is a graph showing the relationship of grid voltage versus beam current for the electron gun.

The storage process is graphically shown in FIG. 2. The eight bit counter 40 produces 256 small steps along the line 60 of the beam current versus grid voltage curve. The larger steps on line 62 represent the grid voltages stored in the memory 38. The points of coincidence 66 and 68 between the two lines 60 and 62 represent the grid voltages stored in the memory 38 and the corresponding beam current which these voltages will generate. The choice of 64 discrete beam current steps is based on the assumption that the three colors must be resolved into 64 discrete current levels in order to provide sufficient brightness gradation to display acceptable pictures. In addition, 256 grid voltage levels are assumed because it is expected that four times as many voltage steps as gun current steps will be required to create the proper number of current steps allowing for gamma correction and variation in gun performance. The present invention may be utilized with more or less brightness gradations depending upon the particular application for the display.

During the displaying of an image, the switches 30 and 32 are connected to a central display clock (not shown) which causes the digitized brightness signal stored in the secondary shift register to address the memory 38. The digitized grid voltage information stored at the addressed location is read out and fed into the second D/A converter where it is multiplied by the contrast reference signal and fed into the grid amplifier to drive the grid into the gun 12. The electron beam is then focused on the screen to illuminate a particular picture element. When another picture element is to be illuminated, the clocking pulse on lines 50 cause another digitized brightness word to address the memory 38 and the process is repeated. During vertical retrace of the display, the contents of the memory 38 may be updated in a similar fashion to the storage of initial information previously described. In a 512 bit random access memory with a two microsecond read-write cycle time, ample time exists during the vertical retrace to update all 64 addresses in the memory. It may not be necessary for all applications to update the memory during every vertical retrace.

I claim:

1. A system for controlling an electron gun having a grid for modulating the generated electron beam, said system comprising:
    means for biasing the modulating grid in response to a signal;
    means for sensing the current of the electron beam;
    means for storing the signals applied to the biasing means which generate given electron beam currents; and
    means for applying the stored signals to said biasing means for controlling said electron gun.

2. The system as in claim 1 wherein the storage means comprises:
    a random access memory; and
    means for generating a signal to be stored in the memory in response to the output from the sensing means.

3. The system as in claim 1 wherein the sensing means comprises:
    an electron beam collector;
    a collector current resistor connected between the collector and the anode potential;
    a reference signal generator; and
    a comparator for comparing the output of the sensing means with the reference signal from the generator.

4. The system as in claim 3 wherein the reference signal generator comprises a first digital counter and a first digital to analog converter.

5. The system as in claim 2 wherein the means for generating a signal to be stored comprise a second digital counter.

6. The system as in claim 3 wherein the sensing means includes a gamma correction circuit between the reference signal generator and the comparator.

7. The system as in claim 1 wherein the modulating grid biasing means comprises:
   a second digital to analog converter for translating the stored memory information into analog form; and
   a grid amplifier having its input connected to the second digital to analog converter and its output connected to the grid of the electron gun.

8. An electron gun control system comprising:
   a collector for sensing the electron beam current from the gun;
   a first digital counter;
   a first multiplying digital to analog converter having one multiplying input connected to the output of the first digital counter and the other multiplying input connected to a reference contrast signal;
   a gamma correction circuit connected to the output of the first multiplying digital to analog converter;
   a comparator for comparing the sensed electron beam current signal from the collector to the output of the gamma correction circuit, the output of said comparator connected to the first digital counter for advancing the counter;
   a second digital counter;
   a random access memory for storing the words from the second digital counter, the storing being controlled by the output of the comparator;
   a second multiplying digital to analog converter for multiplying the information stored in the random access memory by a reference contrast signal; ad
   a grid amplifier having its input connected to the output of the second multiplying digital to analog converter and its output connected to the grid of the electron gun to be controlled.

9. A system for controlling an electron gun of a display device, said device comprising an image screen and a plurality of electron guns, each of which includes a biasing grid and is adapted to scan a different portion of said screen and wherein the electron beam current varies from gun to gun for a given grid bias, said system comprising:
   means for generating a plurality of reference signals;
   means for biasing the grid of said gun to be controlled with said reference signals;
   means for sensing the beam current of said gun to determine which of said reference signals produce predetermined beam currents;
   means for storing those of said reference signals which produce said predetermined beam currents; and
   means for addressing said stored reference signals with brightness signals to feed corresponding ones of said stored reference signals to said grid biasing means.

* * * * *